United States Patent
Xu

(10) Patent No.: US 8,996,997 B2
(45) Date of Patent: Mar. 31, 2015

(54) FLIP-THROUGH FORMAT TO VIEW NOTIFICATION AND RELATED ITEMS

(75) Inventor: Jian Xu, Santa Clara, CA (US)

(73) Assignee: SAP SE, Walldorf (DE)

( * ) Notice: Subject to any disclaimer, the term of this patent is extended or adjusted under 35 U.S.C. 154(b) by 151 days.

(21) Appl. No.: 13/449,530

(22) Filed: Apr. 18, 2012

(65) Prior Publication Data

US 2013/0283167 A1    Oct. 24, 2013

(51) Int. Cl.
*G06F 3/16*   (2006.01)
*H04M 1/725*   (2006.01)

(52) U.S. Cl.
CPC ...... *H04M 1/72519* (2013.01); *H04M 2250/22* (2013.01); *H04M 2250/60* (2013.01)
USPC ....................................... 715/728

(58) Field of Classification Search
CPC ............ G06F 17/3089; G06F 3/04842; G06F 17/2235; G06F 17/20; G06F 19/3462; G06F 3/023; G06F 3/0416; G06F 3/045; G06F 3/04847; G06F 3/04883; G06F 8/71; G06F 9/44

See application file for complete search history.

(56) References Cited

U.S. PATENT DOCUMENTS

| | | | |
|---|---|---|---|
| 2007/0082707 A1 | 4/2007 | Flynt et al. | |
| 2009/0007017 A1 | 1/2009 | Anzures et al. | |
| 2009/0216847 A1* | 8/2009 | Krishnaswamy et al. | 709/206 |
| 2009/0249247 A1* | 10/2009 | Tseng et al. | 715/808 |
| 2009/0271703 A1* | 10/2009 | Chu et al. | 715/702 |
| 2009/0327953 A1 | 12/2009 | Honkala et al. | |
| 2011/0164058 A1* | 7/2011 | Lemay | 345/651 |
| 2012/0052889 A1* | 3/2012 | Clark et al. | 455/466 |
| 2012/0150538 A1* | 6/2012 | Proux et al. | 704/235 |
| 2013/0185650 A1* | 7/2013 | Gutowitz | 715/752 |

FOREIGN PATENT DOCUMENTS

| | | |
|---|---|---|
| EP | 2015176 A1 | 1/2009 |
| EP | 2096849 A1 | 9/2009 |
| WO | WO2009097555 A2 | 8/2009 |

OTHER PUBLICATIONS

Extended European Search Report, from a corresponding foreign application, EP13001438.4, mailed Jul. 18, 2013.

* cited by examiner

*Primary Examiner* — William Bashore
*Assistant Examiner* — Rayeez Chowdhury
(74) *Attorney, Agent, or Firm* — Fountainhead Law Group PC

(57) ABSTRACT

Embodiments relate to systems and methods providing a flip-though format for viewing notification of messages and related items on devices, for example personal mobile devices such as smart phones. According to an embodiment, an unread item most recently received is shown in full screen on the mobile device. While the user is viewing this item, the device will automatically retrieve and load into a cache memory, the next most recently received item. When the user is done viewing the item most recently received, the user can swipe a finger across the touch screen to trigger a page flipping animation and display of the next most recently received item. Embodiments avoid the user having to click back and forth between a list of notifications/links and corresponding notification items.

11 Claims, 7 Drawing Sheets

FLIP-THROUGH FORMAT TO VIEW NOTIFICATION AND RELATED ITEMS

BACKGROUND

Unless otherwise indicated herein, the approaches described in this section are not prior art to the claims in this application and are not admitted to be prior art by inclusion in this section.

Portable computing devices such as smart phones play an increasingly important role in personal and business activities. Such devices may carry communications through a variety of channels, including but not limited to voice, emails, SMS messages, and message boards hosted on internet web sites.

The large volume of communications occurring on a daily basis through such portable devices, places a burden on the user to read them and access any relevant attachments. Conventionally, a user may be notified of the existence of a communication by its presentation on a notification list on the screen. In particular, each notification represents a link to the item (e.g. message) for which the notification was sent.

In order to access and view particular items on a conventional notification list, users are required to take multiple steps to repeatedly shuffle back and forth between the item and the list. This repeated activity is cumbersome and can interfere with a user's ability to access information being communicated to him or her.

The present disclosure addresses this and other issues with systems and methods providing a flip-though format to view notifications and related items for touch screen mobile devices.

SUMMARY

Embodiments relate to systems and methods providing a flip-though format for viewing notification of messages and related items on mobile devices. According to an embodiment, an unread item most recently received is shown in full screen on the mobile device. While the user is viewing this item, the device will automatically retrieve and load into a cache memory, the next most recently received item. When the user is done viewing the item most recently received, the user can swipe a finger across the touch screen to trigger a page flipping animation and display of the next most recently received item. Embodiments avoid the user having to click back and forth between a list of notifications/links and corresponding notification items.

An embodiment of a computer-implemented method comprises receiving a most recent message at a device comprising a screen, a cache memory, a caching engine, and a view engine. The view engine is caused to create a view of the most recent message. The cache engine is caused to store the view of the most recent message in the cache memory. A next most recent message is received at the device. The view engine is caused to create a view of the next most recent message. In response to a first user input received at the device, the device is caused to display the view of the most recently received message on the screen, and the cache engine is caused to automatically load into the cache memory, the view of the next most recent message. In response to a second user input received at the device, the device is caused to display the view of the next most recent message on the screen.

An embodiment of a non-transitory computer readable storage medium embodies a computer program for performing a method comprising receiving a most recent message at a device comprising a screen, a cache memory, a caching engine, and a view engine. The view engine is caused to create a view of the most recent message. The cache engine is caused to store the view of the most recent message in the cache memory. A next most recent message is received at the device. The view engine is caused to create a view of the next most recent message. In response to a first user input received at the device, the device is caused to display the view of the most recently received message on the screen, and the cache engine is caused to automatically load into the cache memory, the view of the next most recent message. In response to a second user input received at the device, the device is caused to display the view of the next most recent message on the screen.

An embodiment of a computer system comprises one or more processors and a software program executable on said computer system. The software program is configured to cause a device comprising a screen, a cache memory, a caching engine, and a view engine to receive a most recent message. The software program is further configured to cause the view engine to create a view of the most recent message. The software program is configured to cause the cache engine to store the view of the most recent message in the cache memory. The software program is configured to cause the device to receive a next most recent message. The software program is configured to cause the view engine to create a view of the next most recent message. In response to a first user input received at the device, the software program is configured to cause the device to display the view of the most recently received message on the screen, and to cause the cache engine to automatically load into the cache memory, the view of the next most recent message. In response to a second user input received at the device, the software program is configured to cause the device to display the view of the next most recent message on the screen.

In certain embodiments the screen comprises a touch screen, and the second user input comprises touching the touch screen.

According to some embodiments, touching the touch screen comprises swiping across the touch screen in a first direction.

Particular embodiments further comprise in response to a third user input received at the device, causing the device to return to display the view of the most recent message on the screen.

In some embodiments the screen comprises a touch screen, the second user input comprises swiping across the touch screen in a first direction, and the third user input comprises swiping across the touch screen in a second direction opposite to the first direction.

In particular embodiments the device comprises a microphone, and the second user input comprises a voice command.

Certain embodiments further comprise displaying a page flipping animation on the screen.

The following detailed description and accompanying drawings provide a better understanding of the nature and advantages of various embodiments.

DETAILED DESCRIPTION

The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, examples and specific details are set forth in order to provide a thorough understanding of various embodiments of the present invention. It will be evident, however, to one skilled in the art that the present invention as defined by the claims may include some or all of the features in these examples alone or in combination with other features described below, and may further include modifications and equivalents of the features and concepts described herein.

Embodiments relate to systems and methods providing a flip-though format for viewing notifications and related items on personal mobile devices. According to an embodiment, an unread item most recently received is shown in full screen on the mobile device. While the user is viewing this item, the device will retrieve and store in a cache memory, a next most recently received item. When the user is done viewing the item most recently received, the user can provide an input (such as swiping a finger across the touch screen) to trigger display the next most recently received item. In certain embodiments, this change in display may be accompanied by a page flipping animation. As a result of receiving this user input, the next further item is caused to become automatically loaded in the cache memory. Repetition of the process can allow access to other items received at the personal mobile device.

Embodiments avoid the user having to click back and forth between a list of notifications/links and the corresponding notification items. The flipping interface according to various embodiments, helps to ensure that the user sees all items for which notifications have been sent, without going back and forth through a notification list and click on links. Thus, the user can quickly go through the items of which they are being notified.

Figure 1A:
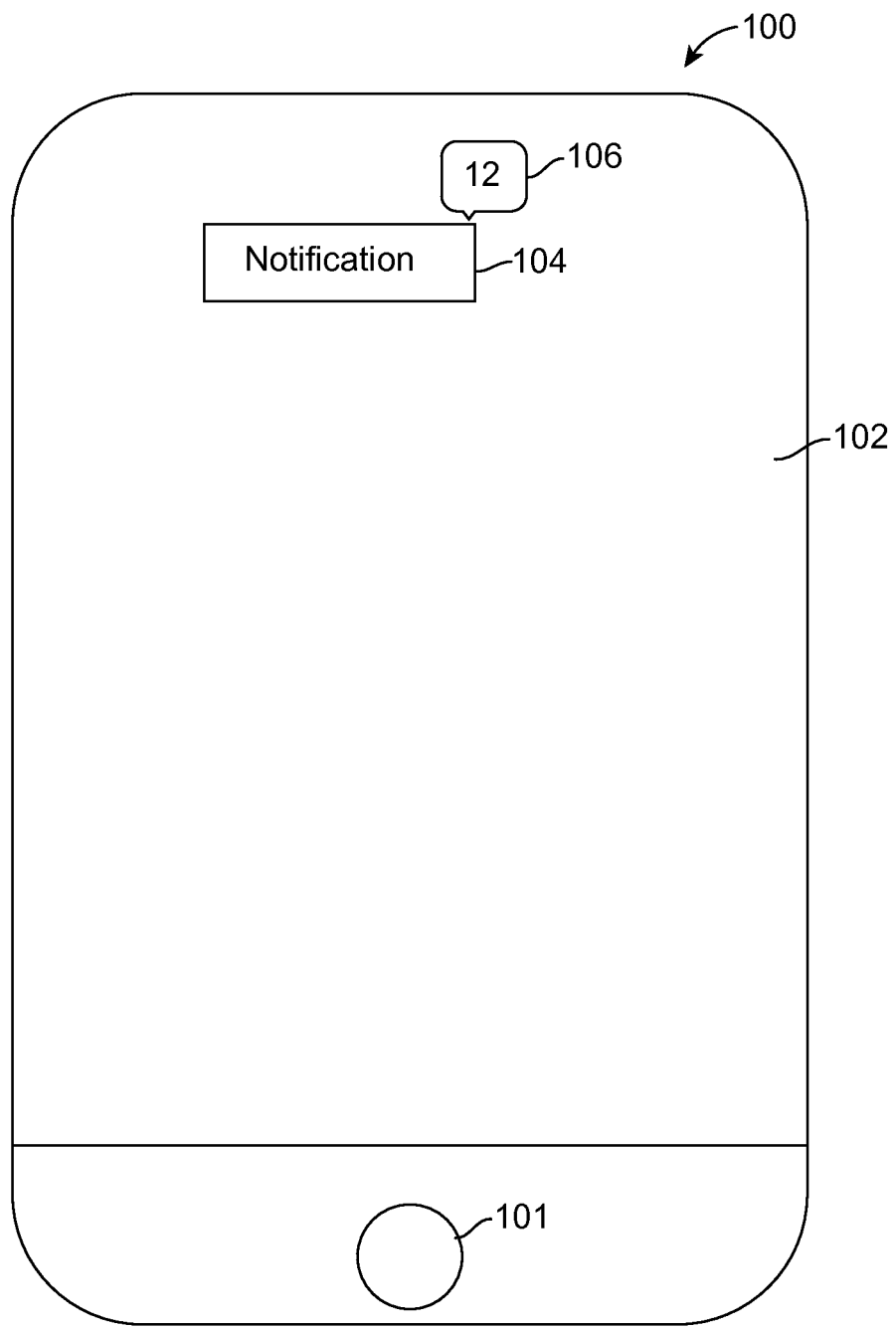
FIG. 1A shows a screen of a mobile device including a notification icon.

FIG. 1A shows a general view of a portable electronic device including a touch screen. In particular, device 100 features a microphone 101 and a touch screen 102 that includes a notification icon 104. In this particular embodiment, the notification icon 104 further includes a counter 106 indicating of a number of messages not yet accessed by a user.

Figure 1B:
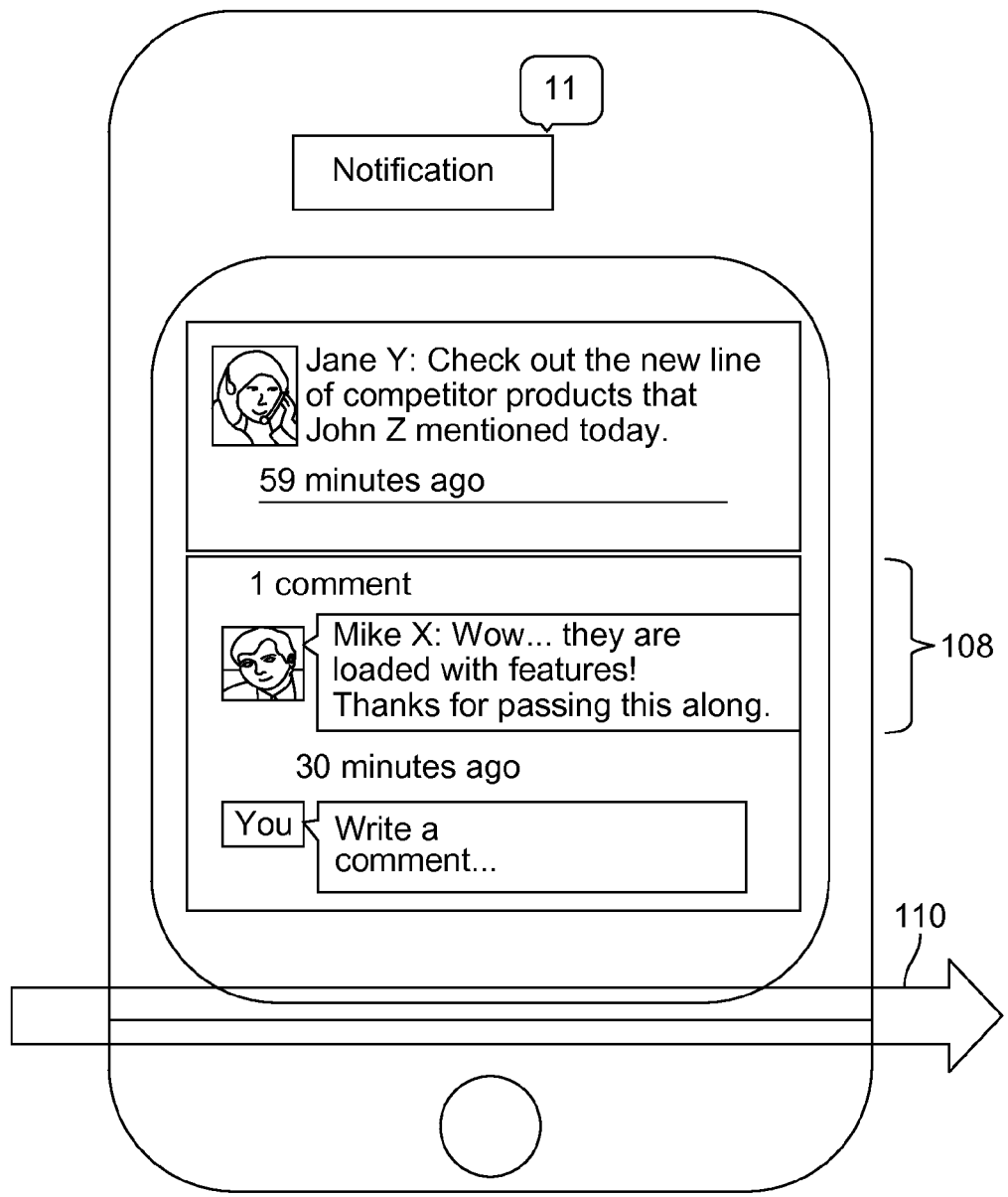
FIG. 1B shows accessing a view of a most recently received message on the mobile device according to an embodiment.

Upon clicking the notification icon, items related to the notification will be displayed. As shown in FIG. 1B, the user is presented with a screen indicating the most recently received communication 108. The counter 106 is updated to reflect that this item has now been read by the user.

While the user is viewing the communication 108, a second (next-most-recently received) item will be retrieved and loaded to a cache memory of the device. Accordingly, that next notification may be loaded onto the screen in a more streamlined manner, with less delay.

Figure 1C:
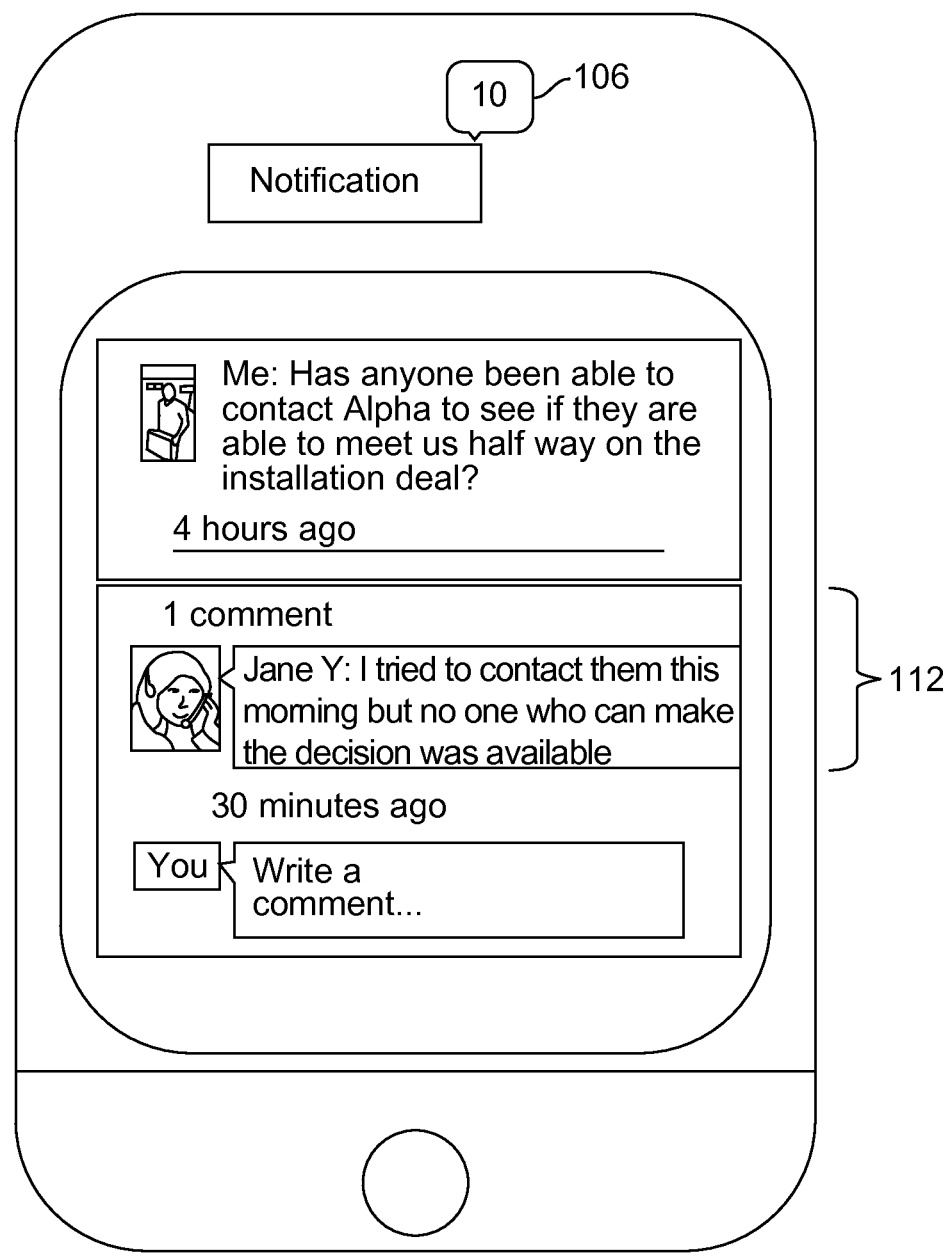
FIG. 1C shows accessing a view of a next-most recently received message according to an embodiment.

In particular, when the user swipes her finger across the screen to the right along the arrow 110, an animation imitating the forward-flipping of a page can be displayed. FIG. 1C shows the next display wherein a second, next-most recent item 112 is loaded onto the screen from the cache memory of the device.

FIG. 1C shows the screen once the user has swiped her finger to the right along the arrow to cause the screen to display the next notification. In particular, the next item 112 is loaded from the cache memory onto the screen of the device. Also, the counter 106 is updated to reflect user access to this item 112.

According to certain embodiments, the swipe mechanism may be bi-directional. That is, when the user swipes from left to right, the screen displays the next item. By contrast, when the user swipes from right to left, the screen returns to display the previously viewed item. This change in display may be accompanied by display of an animation imitating the backward-flipping of a page. In this manner, embodiments may mimic the action of flipping through physical pages of a book.

While this particular embodiment has relied upon a user input in the form of a horizontal swipe of a touchscreen, this is not required. Alternative embodiments could receive user inputs in the form of swiping a touchscreen in other directions, including but not limited to swiping in the vertical or diagonal directions.

Figure 1D:
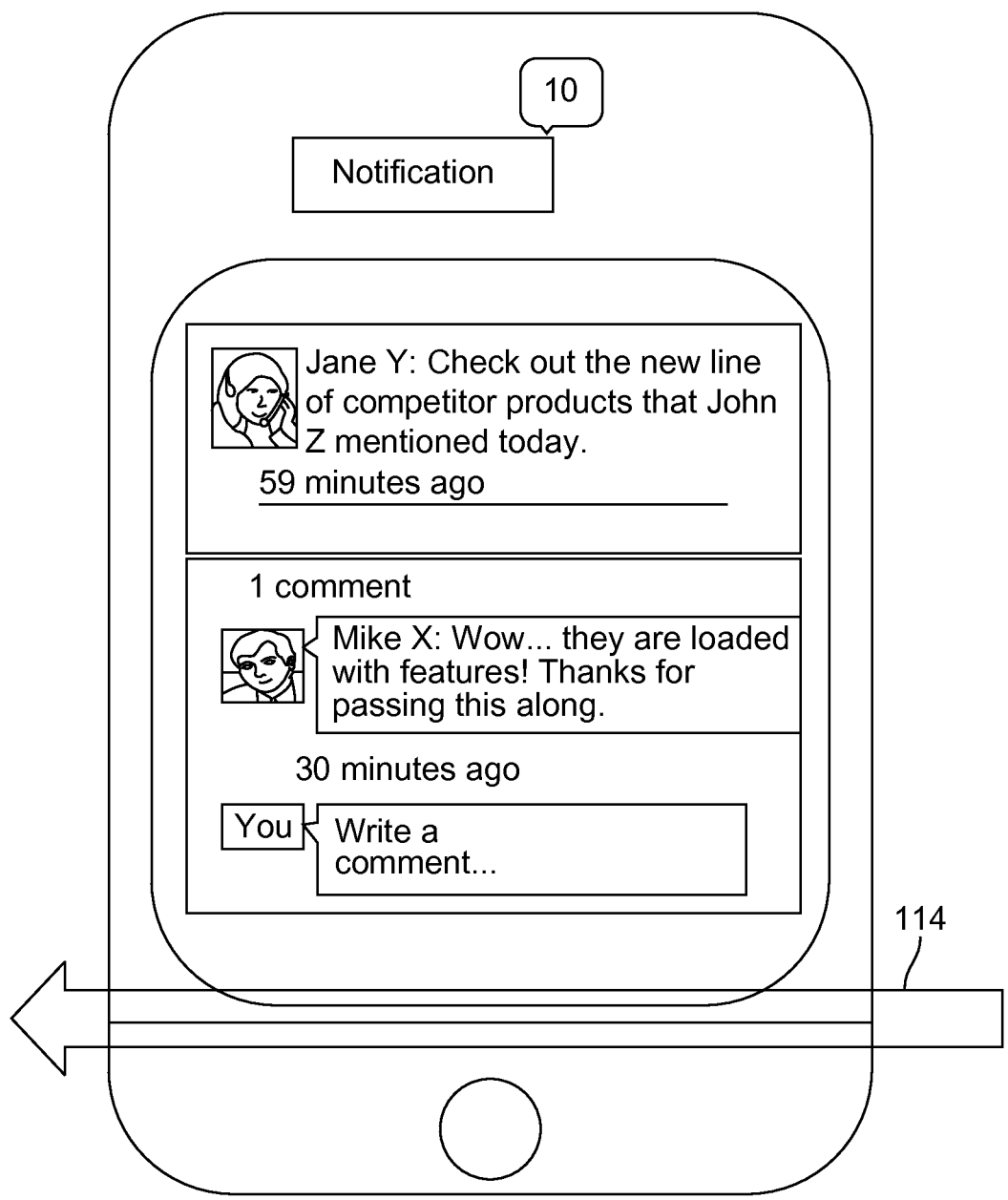
FIG. 1D shows returning to the previously viewed message on the mobile device.

FIG. 1D shows the screen once the user has swiped her finger to the left along the arrow 114 to cause the screen to display the previous notification. The notification counter 106 remains updated to reflect the latest number of items unread on the mobile device.

It is noted that the cache memory of the personal mobile device may very well have sufficient capacity to store a number of message views for ready access. Thus where permitted by capacity, the loading of a next-most-recently-received message into the cache upon viewing of a message, does not necessarily require erasure/re-loading of that previous message view to the cache. Such preservation in the cache of recently received messages, would facilitate rapid user re-access to messages already viewed, in the manner of FIG. 1D.

FIGS. 1A-D show only one particular embodiment of a user interface, and others are possible. For example, while this particular embodiment shows a user input as a finger swipe in a horizontal direction, this is not required. Alternative embodiments could employ a finger swipe in another direction (e.g. vertical, diagonal) on the touch screen.

Moreover, while the embodiment of FIGS. 1A-D relies upon a user input in the form of a physical touching of the view screen of the personal mobile device, this is not required. Alternative embodiments could employ other than touching of a view screen. For example, certain embodiments could rely upon touching of button(s) dedicated to accessing messages from a notification list in the manner described.

Still further alternatively, certain embodiments could rely upon user inputs comprising other than physical touching of the personal mobile device. According to some embodiments, such a user input could take the form of verbal commands uttered to access the appropriate message and to trigger movement of data to/from a cache memory of the personal mobile device. Examples of such verbal commands issued by a user include but are not limited to words such as, "next", "previous", "up", "down", "forward", and "back".

While an embodiment has been illustrated above in connection with an interface of a personal mobile general communication device such as a smart phone, this is not required. Alternative embodiments could provide access to items on other types of devices, including but not limited to desktop devices and/or those dedicated to performing specific purposes. While particular examples include but are not limited to the IPad™, IPhone™, IPod™, and Android™ type cell phones, embodiments may potentially be used in conjunction with any computing device that can receive updates/notification for the users for viewing.

Embodiments may be employed to access to items comprising messages and/or attachments communicated through a variety of channels. Examples of such messages include but are not limited to emails, voice messages, text messages (e.g. SMS), and message boards hosted on internet web sites.

Embodiments may be used in conjunction with applications that generate and send notifications/updates concerning a longer/more detailed item. Particular examples include but are not limited to Facebook™, SAP Sales OnDemand™, Twitter™, Pinterest™, Yelp™, and CNN™.

Figure 2:
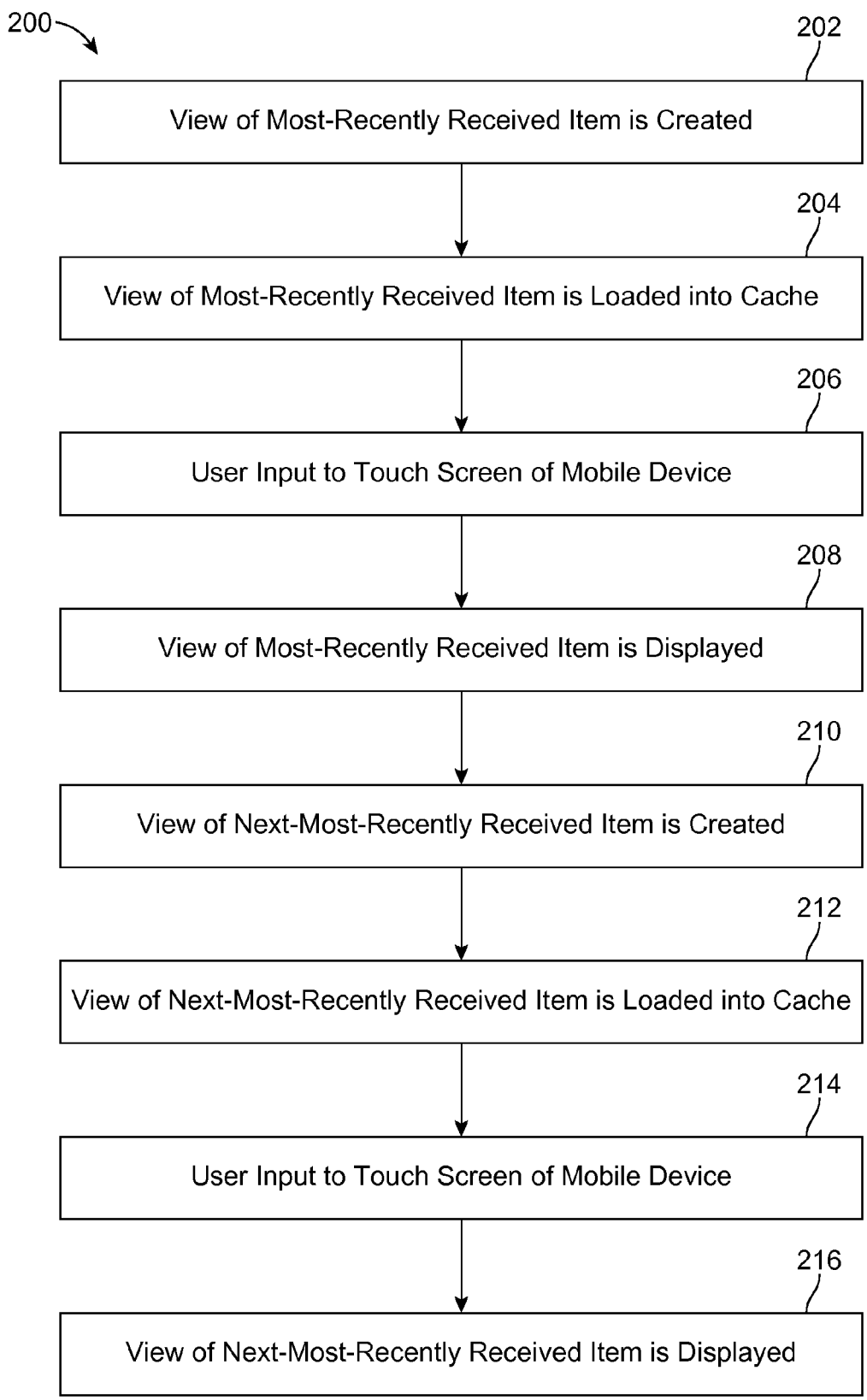
FIG. 2 shows a simplified process flow of notification viewing according to an embodiment.

FIG. 2 is a simplified diagram illustrating a process flow for viewing items from a notification list according to an embodiment. In a first step 202, a view of a most-recently received item on a device, is created by a view engine. In a second step 204, the view of the most-recently received item is uploaded to a cache memory of the device. In a third step 206, the user provides an input to the touch screen of the device that indicates a desire to view the most-recently received item.

In a fourth step 208, the view of the most recently received item is displayed on the screen of the device. In a fifth step 210, the view of the next-most recently received item is created by the view engine. In a sixth step 212, the view of the next-most-recently received item is uploaded to a cache memory.

In a seventh step 214, the user provides an input to the touch screen of the device that indicates a desire to view the next-most-recently received item. In an eighth step 216, the view of the next-most-recently received item is displayed on the screen of the device.

Figure 3:
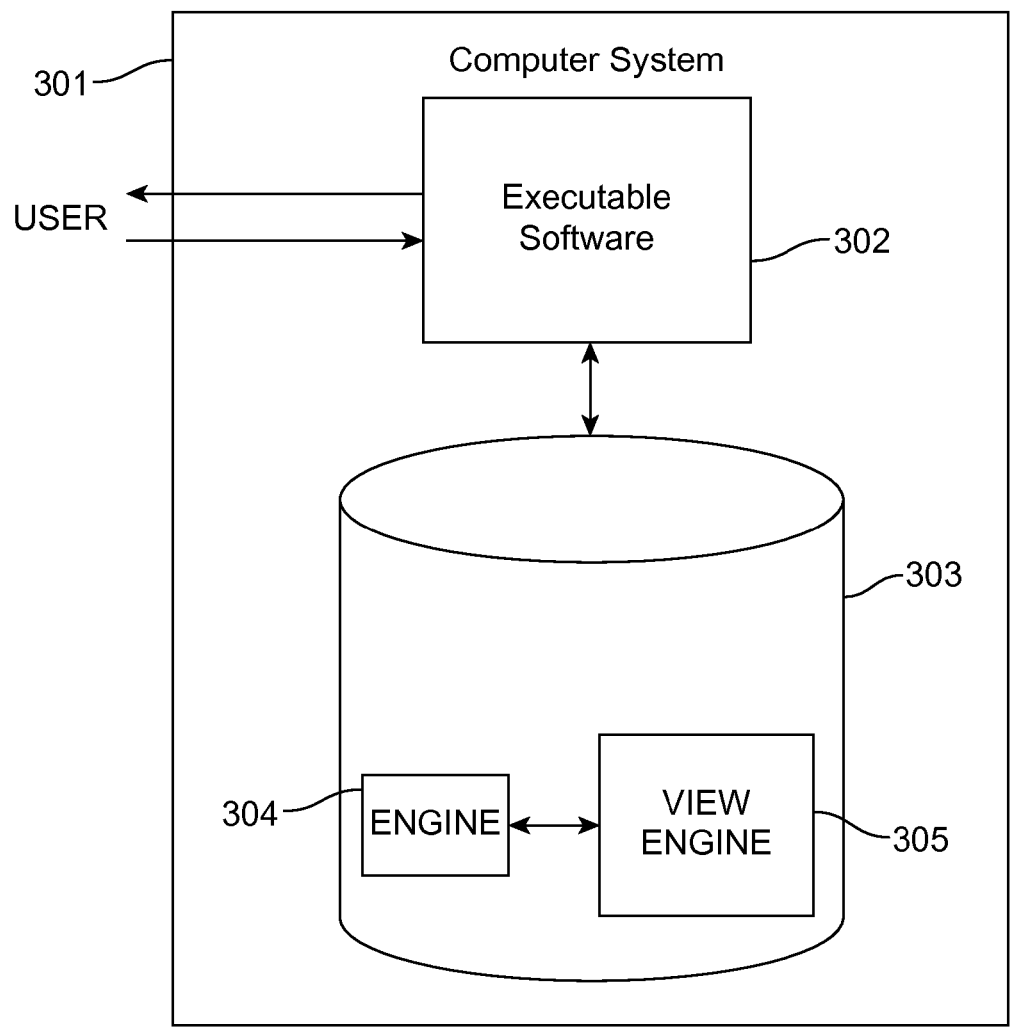
FIG. 3 illustrates hardware of a special purpose computing machine which may be configured to implement notification viewing in accordance with particular embodiments.

FIG. 3 illustrates hardware of a special purpose computing machine. This computing machine may be configured to implement viewing in accordance with particular embodiments.

In particular, computer system 300 comprises a processor 302 that is in electronic communication with a non-transitory computer-readable storage medium 303. This computer-readable storage medium has stored thereon code 305 corresponding to a view generation engine that is responsible for creating message views for display on a screen of a device. Code 304 corresponds to the caching engine responsible for loading a generated message view onto a cache memory for quick access and display. Code may be configured to reference data stored in a database of a non-transitory computer-readable storage medium, for example as may be present in the device itself, or even as located in a remote server.

Embodiments may be run in conjunction with a computer system which may comprise a software server. A number of software servers together may form a cluster, or logical network of computer systems programmed with software programs that communicate with each other and work together to process requests.

Figure 4:
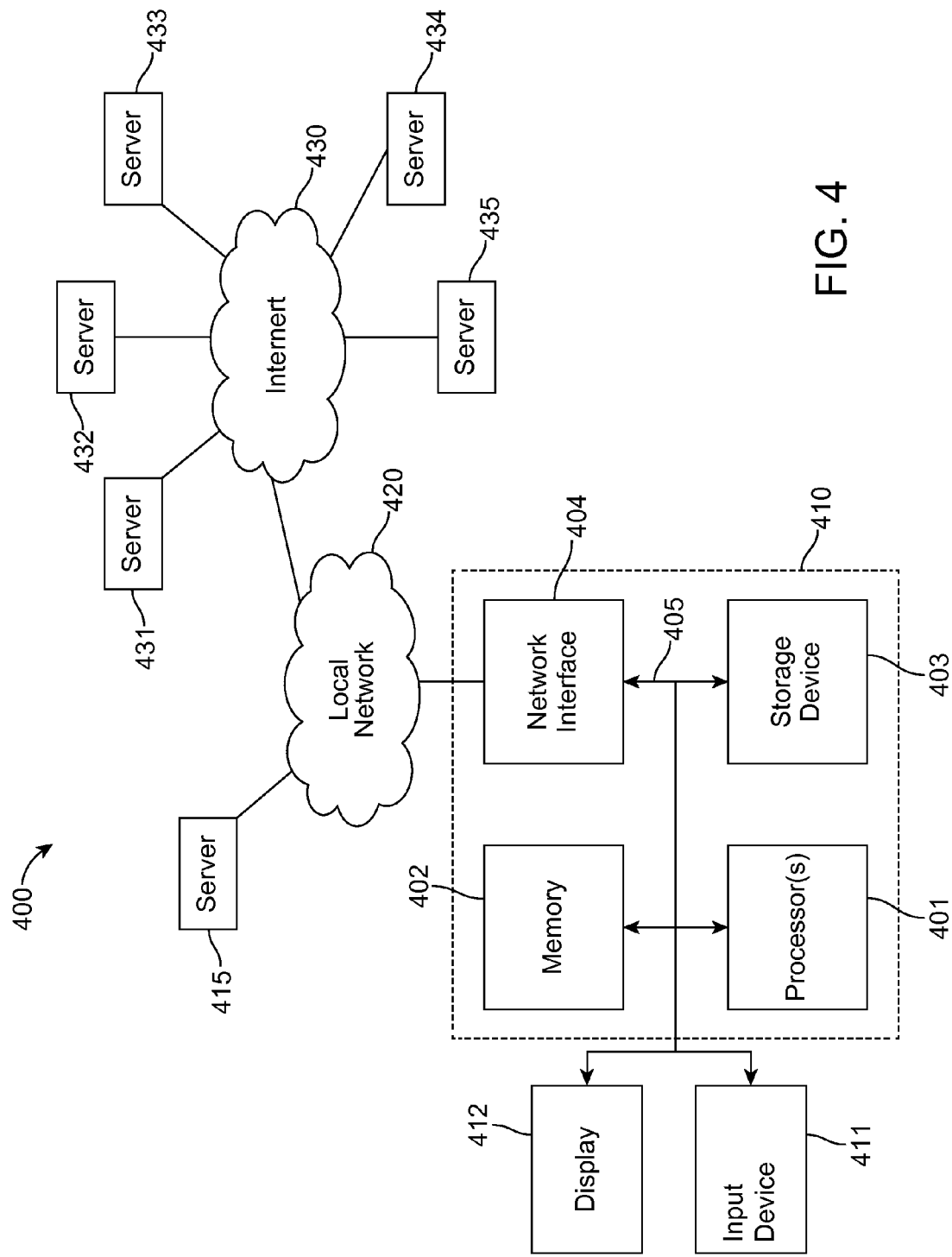
FIG. 4 illustrates an example of a computer system.

An example computer system 410 is illustrated in FIG. 4. Computer system 410 includes a bus 405 or other communication mechanism for communicating information, and a processor 401 coupled with bus 405 for processing information.

Computer system 410 also includes a memory 402 coupled to bus 405 for storing information and instructions to be executed by processor 401, including information and instructions for performing the techniques described above, for example. This memory may also be used for storing variables or other intermediate information during execution of instructions to be executed by processor 401. Possible implementations of this memory may be, but are not limited to, random access memory (RAM), read only memory (ROM), or both.

A storage device 403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 403 may include source code, binary code, or software files for performing the techniques above, for example. Storage device and memory are both examples of computer readable media. The computer system generally described in FIG. 4 includes at least those attributes described in FIG. 3.

Computer system 410 may be coupled via bus 405 to a display 412, such as a cathode ray tube (CRT) or liquid crystal display (LCD), for displaying information to a computer user. An input device 411 such as a touch screen, is coupled to bus 405 for communicating information and command selections from the user to processor 401. The combination of these components allows the user to communicate with the system. In some systems, bus 405 may be divided into multiple specialized buses.

Computer system 410 also includes a network interface 404 coupled with bus 405. Network interface 404 may provide two-way data communication between computer system 410 and the local network 420. The network interface 404 may be for Broadband Wireless Access (BWA) technologies. In any such implementation, network interface 404 sends and receives electrical, electromagnetic, or optical signals that carry digital data streams representing various types of information.

Computer system 410 can send and receive information, including messages or other interface actions, through the network interface 404 across a local network 420, an Intranet, or the Internet 430. For a local network, computer system 410 may communicate with a plurality of other computer machines, such as server 415. Accordingly, computer system 410 and server computer systems represented by server 415 may form a cloud computing network, which may be programmed with processes described herein.

In an example involving the Internet, software components or services may reside on multiple different computer systems 410 or servers 431-435 across the network. The processes described above may be implemented on one or more servers, for example. A server 431 may transmit actions or messages from one component, through Internet 430, local network 420, and network interface 404 to a component on computer system 410. The software components and processes described above may be implemented on any computer system and send and/or receive information across a network, for example.

Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving a first message at a device comprising a touch screen, a cache memory, a caching engine, and a view engine;
causing the view engine to create a view including a first icon, of the first message;
causing the cache engine to store the view of the first message in the cache memory;

receiving a second message at the device;
causing the view engine to create a view of the second message, the view comprising a second icon indicating a number of unread messages;
in response to a first user input received at the device,
    causing the device to display the view of the first message on the touch screen, and
    causing the cache engine to automatically load into the cache memory, the view of the second message;
in response to a second user input comprising swiping across the touch screen outside of the first icon in the first direction received at the device, causing the device to display the view of the second message on the touch screen, and to automatically load into the cache memory, a view of a third message;
in response to a third user input comprising swiping across the touch screen in the first direction, causing the device to display the view of the third message on the touch screen; and
in response to a fourth user input comprising swiping across the touch screen in a second direction opposite to the first direction received at the device, causing the device to return to display the second message on the touch screen, and to automatically load into the cache memory the view of the first message.

2. The method of claim 1 wherein the first direction is from left to right.

3. The method of claim 1 wherein the first direction is from top to bottom.

4. The method of claim 1 further comprising displaying a page flipping animation on the screen.

5. A non-transitory computer readable storage medium embodying a computer program for performing a method, said method comprising:
    receiving a first message at a device comprising a touch screen, a cache memory, a caching engine, and a view engine;
    causing the view engine to create a view including a first icon, of the first message;
    causing the cache engine to store the view of the first message in the cache memory;
    receiving a second message at the device;
    causing the view engine to create a view of the second message, the view comprising a second icon indicating a number of unread messages;
    in response to a first user input received at the device,
        causing the device to display the view of the first message on the touch screen, and
        causing the cache engine to automatically load into the cache memory, the view of the second message;
    in response to a second user input comprising swiping across the touch screen outside of the first icon in the first direction received at the device, causing the device to display the view of the second message on the touch screen, and to automatically load into the cache memory, a view of a third message;
    in response to a third user input comprising swiping across the touch screen in the first direction, causing the device to display the view of the third message on the touch screen; and
    in response to a fourth user input comprising swiping across the touch screen in a second direction opposite to the first direction received at the device, causing the device to return to display the second message on the touch screen, and to automatically load into the cache memory the view of the first message.

6. The non-transitory computer readable storage medium of claim 5 wherein the first direction is from left to right.

7. The non-transitory computer readable storage medium of claim 5 wherein the first direction is from top to bottom.

8. The non-transitory computer readable storage medium of claim 5 further comprising displaying a page flipping animation on the screen.

9. A computer system comprising:
    one or more processors;
    a software program, executable on said computer system, the software program configured to:
    cause a device comprising a touch screen, a cache memory, a caching engine, and a view engine to receive a first message;
    cause the view engine to create a view including a first icon of the first message;
    cause the cache engine to store the view of the first message in the cache memory;
    cause the device to receive a second message;
    cause the view engine to create a view of the second message, the view comprising a second icon indicating a number of unread messages;
    in response to a first user input received at the device,
        cause the device to display the view of the first message on the touch screen, and
        cause the cache engine to automatically load into the cache memory, the view of the second message;
    in response to a second user input comprising swiping across the touch screen outside of the first icon in the first direction received at the device, cause the device to display the view of the second message on the touch screen, and to automatically load into the cache memory, a view of a third message;
    in response to a third user input comprising swiping across the touch screen in the first direction, cause the device to display the view of the third message on the touch screen; and
    in response to a fourth user input comprising swiping across the touch screen in a second direction opposite to the first direction received at the device, cause the device to return to display the second message on the touch screen, and to automatically load into the cache memory the view of the first message.

10. The computer system of claim 9 wherein the first direction is from left to right.

11. The computer system of claim 9 wherein the first direction is from top to bottom.

* * * * *